(12) United States Patent  (10) Patent No.: US 6,737,987 B2
Conner et al.  (45) Date of Patent: May 18, 2004

(54) METHOD, APPARATUS AND COMPUTER PROGRAM PRODUCT FOR HELICOPTER TAIL STRIKE WARNING

(75) Inventors: Kevin Conner, Kent, WA (US); Noel Paterson, Woodinville, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/865,365

(22) Filed: May 25, 2001

(65) Prior Publication Data

US 2002/0030607 A1 Mar. 14, 2002

Related U.S. Application Data

(60) Provisional application No. 60/232,967, filed on Sep. 14, 2000.

(51) Int. Cl.[7] ............................................. G08B 21/00
(52) U.S. Cl. .................. 340/946; 73/178 H; 244/17.11
(58) Field of Search ............................ 340/946, 963, 340/967, 970; 73/178 H; 244/17.11

(56) References Cited

U.S. PATENT DOCUMENTS

| | | |
|---|---|---|
| 3,715,718 A | 2/1973 | Astengo |
| 3,925,751 A | 12/1975 | Bateman et al. |
| 3,934,221 A | 1/1976 | Bateman et al. |
| 3,934,222 A | 1/1976 | Bateman et al. |
| 3,936,796 A | 2/1976 | Bateman |
| 3,944,968 A | 3/1976 | Bateman et al. |
| 3,947,808 A | 3/1976 | Bateman |
| 3,947,810 A | 3/1976 | Bateman et al. |
| 3,958,218 A | 5/1976 | Bateman |
| 3,958,219 A | 5/1976 | Bateman et al. |
| 3,979,717 A * | 9/1976 | Barnum et al. ............. 340/946 |
| 4,027,838 A * | 6/1977 | Barnum et al. ............. 340/946 |
| 4,030,065 A | 6/1977 | Bateman |
| 4,060,793 A | 11/1977 | Bateman |
| 4,215,334 A | 7/1980 | Bateman |
| 4,224,669 A | 9/1980 | Brame |
| 4,319,218 A | 3/1982 | Bateman |
| 4,551,723 A | 11/1985 | Paterson |
| 4,646,244 A | 2/1987 | Bateman et al. |
| 4,675,823 A | 6/1987 | Noland, deceased |
| 4,769,645 A | 9/1988 | Paterson ....................... 340/946 |
| 4,818,992 A | 4/1989 | Paterson |
| 4,914,436 A | 4/1990 | Bateman et al. |
| 5,414,631 A | 5/1995 | Denoize et al. |
| 5,448,563 A | 9/1995 | Taniguchi |
| 5,661,486 A | 8/1997 | Faivre et al. |
| 5,666,110 A | 9/1997 | Paterson |
| 5,781,126 A | 7/1998 | Paterson et al. |
| 5,839,080 A | 11/1998 | Muller et al. |
| 6,043,759 A | 3/2000 | Paterson et al. |
| 6,088,634 A | 7/2000 | Muller et al. |
| 6,092,009 A | 7/2000 | Glover |
| 6,122,570 A | 9/2000 | Muller et al. |
| 6,138,060 A | 10/2000 | Conner et al. |

* cited by examiner

Primary Examiner—John Tweel
(74) Attorney, Agent, or Firm—Honeywell Int'l Inc.

(57) ABSTRACT

A method, apparatus and computer program product for alerting the pilot of a helicopter of a possible tail strike hazard.

61 Claims, 6 Drawing Sheets

| MODE 1 | MODE 2 |
|---|---|
| EXCESSIVE DESCENT RATE<br>"SINKRATE"<br>"PULL UP!" | EXCESSIVE TERRAIN CLOSURE RATE<br>"TERRAIN... TERRAIN"<br>"PULL UP!" |

| MODE 6 | MODE 3 |
|---|---|
| AUTOROTATION<br>ALTITUDE CALL-OUTS<br>"...ONE HUNDRED..."<br>BANK ANGLE<br>"BANK ANGLE"<br>TAIL STRIKE<br>"TAIL TOO LOW" | SINK AFTER TAKEOFF<br>"DON'T SINK" |

| MODE 5 | MODE 4 |
|---|---|
| EXCESSIVE DEVIATION<br>BELOW GLIDESLOPE<br>"GLIDESLOPE" | TOO CLOSE TO TERRAIN<br>"TOO LOW - TERRAIN"<br>"TOO LOW - GEAR" |

*Fig. 3*

METHOD, APPARATUS AND COMPUTER PROGRAM PRODUCT FOR HELICOPTER TAIL STRIKE WARNING

CROSS-REFERENCES TO RELATED APPLICATIONS

This application claims priority from co-pending U.S. Provisional application Ser. No. 60/232,967, titled: "Tail Strike Algorithm for Helicopters", filed Sep. 14, 2000 and incorporated herein by reference.

This application is related to co-pending application serial number, titled "Apparatus, Method and Computer Program Product for Helicopter Enhanced Ground Proximity Warning System" filed the same day herewith the entire specification of which is herein incorporated by reference.

BACKGROUND OF THE INVENTION

The present invention is related to ground proximity warning systems and methods for rotary wing aircraft such as helicopters, gyrocopters, and tilt rotors.

Ground proximity warning systems, or GPWS, provide aural and visual warnings of conditions when the aircraft is in potentially hazardous proximity to terrain, and/or in a flight condition apparently inappropriate given the aircraft's position relative to terrain. Earlier generation ground proximity warning systems sensed dangerous approach to terrain by using a radar altimeter to sense height above the ground. The rate at which height above ground changes, is compared with a predefined envelope(s) to determine if a dangerous condition exists. Classic GPWS systems also contain additional alert functions called 'modes' that alert to other potentially hazardous conditions based on flight regime. Examples of GPWS devices are contained in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; and 4,319,218.

Later generation GPWS devices, called EGPWS devices or terrain awareness systems (TAWS), include a stored terrain database that compares the position of the aircraft in three dimensional space with the stored terrain information to identify potential conflicts. EGPWS devices may also include all the functionality and modes of the classic GPWS devices. Examples of EGPWS-type devices include U.S. Pat. Nos. 4,646,244; 5,839,080; 5,414,631; 5,448,563; 5,661,486 4,224,669; 6,088,634; 6,092,009; 6,122,570; and 6,138,060.

The above referenced systems have been primarily developed for fixed wing aircraft. Rotary wing aircraft and aircraft capable of hover present unique challenges for ground proximity alerting due to the different flight profiles flown and the unique capabilities of rotary wing aircraft. For example, unlike fixed wing aircraft, rotary wing aircraft can cease all forward motion while still remaining airborne. Rotary wing aircraft can also descend straight down from a hover to land on all sorts of terrain, and need not make a gradual descent and approach to land as in the case of fixed wing aircraft.

U.S. Pat. No. 5,781,126 titled "Ground Proximity Warning System and Methods for Rotary Wing Aircraft;" U.S. Pat. No. 5,666,110 titled "Helicopter Enhanced Descent After Take-off Warning for GPWS;" and U.S. Pat. No. 6,043,759 titled "Air Ground Logic System and Method for Rotary Wing Aircraft;" and co-pending application Ser. No. 08/844,116 titled: "Systems and Methods for Generating Altitude Callouts for Rotary Wing Aircraft," each address various issues associated with applying ground proximity warning technology to rotary wing aircraft and are each incorporated herein by reference. These patents are applicable to both conventional and enhanced ground proximity warning designs for use in helicopters, however, these patents address the particularities of modifying various of the "modes" for use in helicopters. Specifically, U.S. Pat. No. 5,781,126 includes a barometric altitude rate detector including a controller for adjusting this rate detector to account for downwash of the rotary wing. U.S. Pat. No. 5,666,110 discloses a descent after take-off protection envelope. U.S. Pat. No. 6,043,759 discloses a logic method and device for determining when the helicopter is in the airborne or ground state which assists with preventing nuisance alarms during helicopter autorotations. Ser. No. 08/844,116 discloses a device and method for generating altitude call outs during helicopter landing operations.

Helicopters and certain other types of rotary wing aircraft often additionally contain a tail rotor and a tail boom which extends far behind and is out of sight of the pilot. Helicopters are also capable of off-airport landings, such as on rooftops, on oil rigs, and on hillsides, for example. The helicopter geometry and operating characteristics combine to present a risk of a tail strike during low altitude operations. A tail strike can result in significant damage to the aircraft. In certain situations, a tail a strike can cause complete loss of control and/or serious injury or death to the aircraft occupants.

SUMMARY OF THE INVENTION

The present invention recognizes the problems in ground proximity alerting for rotary wing aircraft such as, for example, helicopters, gyrocopters and tilt rotors when in the rotor mode, hereinafter generically and interchangeably referred to as "helicopter(s)" or "rotary wing aircraft". In particular, the present invention recognizes that rotary wing aircraft have unique, yet normal operating capabilities including hover and an off-airport and heliport landing capability.

According to one aspect of the present invention, the invention provides a method, apparatus and computer program product for alerting the pilot of a rotary wing aircraft to a potential tail strike hazard. By monitoring various flight parameters, the present invention can detect a possible tail strike hazard and alert the pilot in sufficient time for evasive action to be taken.

According to another aspect of the present invention, the invention monitors the aircraft pitch, pitch rate, and altitude rate to compute a predicted pitch angle. The predicted pitch angle and height above terrain are used to index a warning envelope. When the current flight regime of the aircraft is contained within the envelope boundaries, a potentially hazardous condition exists and a warning is given.

According to yet another aspect of the present invention, the invention may be included as part of a classic ground proximity warning system as described in U.S. Pat. Nos. 5,781,126; 5,666,110; 6,043,759, or as part of an enhanced ground proximity warning system such as described in co-pending U.S. application Ser. No. 09/865,333 (Attorney Docket No. 543-00-011) filed the same day herewith and titled: "Apparatus, Method and Computer Program Product For Helicopter Enhanced Ground Proximity Warning System."

BRIEF DESCRIPTION OF THE DRAWINGS

FIG. 3 diagrams six basic warning modes for a helicopter ground proximity warning system according to an embodiment of the present invention;

DETAILED DESCRIPTION OF THE PREFERRED EMBODIMENTS

System Overview

Figure 1:
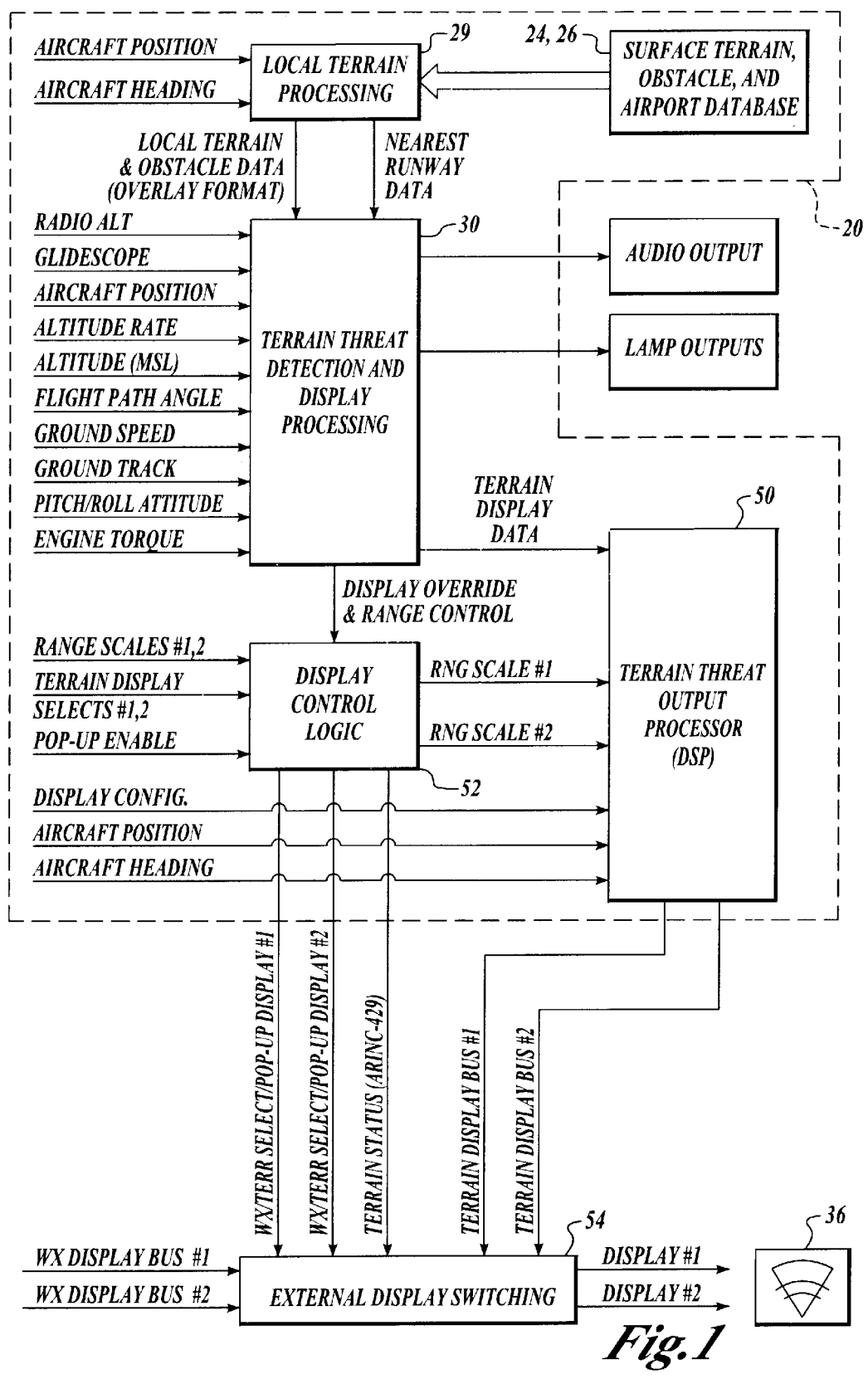
FIG. 1 is a top level block diagram of an EGPWS computer for use on helicopters according to an embodiment of the present invention.
Figure 2:
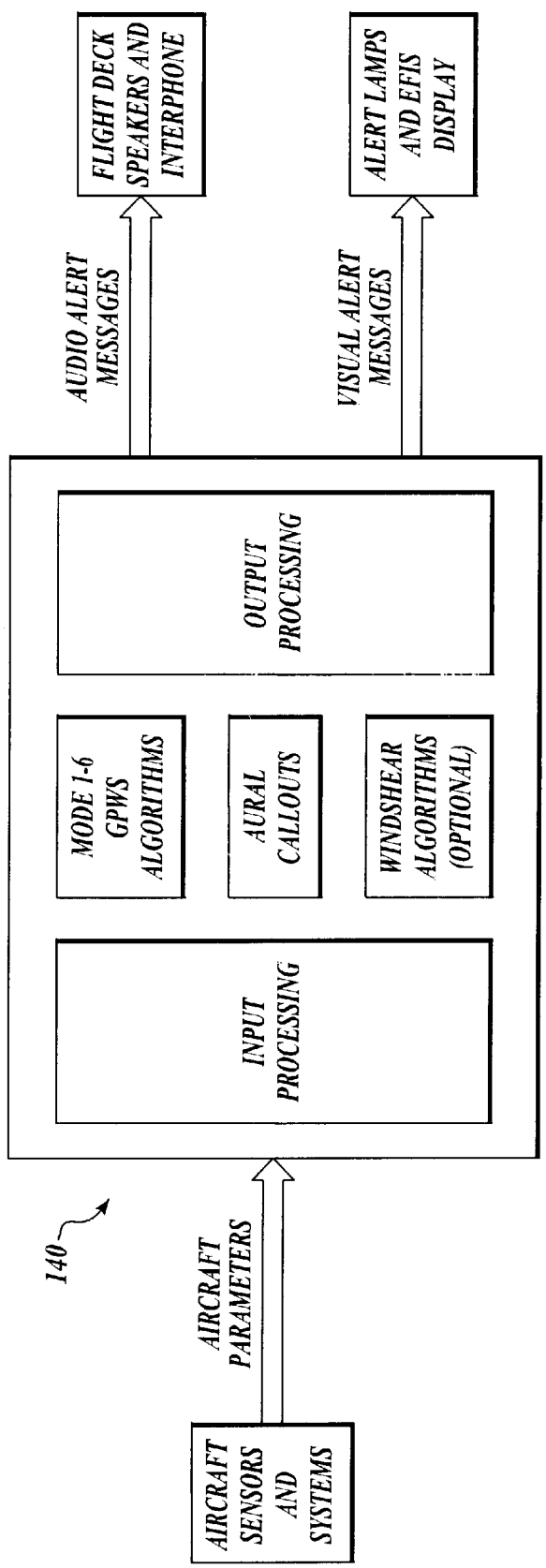
FIG. 2 is a functional block diagram of a GPWS computer according to an embodiment of the present invention.

U.S. Pat. No. 5,839,080 and co-pending application serial no. (Attorney Docket No. 543-00-011) (Attorney Docket No. 543-00-011), each incorporated herein by reference, describes an EGPWS device manufactured by Honeywell International Inc., and suitable for use with the present invention. Additional EGPWS features applicable to rotary wing aircraft are described in U.S. Pat. Nos. 6,138,060; 6,122,570; 6,092,009; 6,088,634; as well as in copending application Ser. Nos. 09/099,822; 09/074,953; 09/103,349; 09/255,670; and 09/496,297 each of which is incorporated by reference. U.S. Pat. Nos. 5,781,126; 5,666,110 and 6,043,759 also incorporated by reference describe a GPWS device(s) suitable for use with the present invention. FIGS. 1 and 2 provide a top level description of such systems in block diagram form.

In the EGPWS device of FIG. 1, a terrain awareness system 20 utilizes navigation information from a global positioning system and/or a flight management system (FMS) and/or inertial navigation system. System 20 further includes a terrain/obstacle database 24, an airport database 26 and a corrected barometric altitude signal which may be obtained from an air data computer or barometric altimeter.

The latitude and longitude of the current aircraft position are applied to an airport and terrain search algorithm, indicated by a block 29 which includes location search logic for determining the terrain data, as well as the airport data surrounding the aircraft. Example search logic is described in U.S. Pat. Nos. 4,675,823 and 4,914,436 assigned to the assignee of the present invention and incorporated herein by reference as well as in U.S. Pat. No. 5,839,080.

Local terrain processing function 29 receives as input the aircraft position and heading data and retrieves from database(s) 24 and 26, the terrain, obstacle and/or runway data in the vicinity of the aircraft. As described in U.S. Pat. No. 5,839,080, herein incorporated by reference for all purposes, terrain processing function 29 extracts and formats the local topographical data and terrain features to create a set of elevation matrix overlays that are positioned with respect to the current aircraft location. Each matrix element includes as data, the highest terrain altitude with respect to mean sea level (MSL) contained within that element's area. Terrain processing function 29 optionally retrieves any obstacle data associated with the matrix elements as well as retrieving data for the runway nearest the current location of the aircraft.

A threat detection and terrain display processing function 30 receives as input the terrain data as processed by function 29 as well as the current aircraft position, altitude, attitude, speed and track information. The parameters are processed by function 30 to obtain a caution and a warning envelope ahead of the aircraft. If terrain data is contained within the caution or warning envelopes a potentially hazardous condition exits. When a potential hazard to the aircraft exists, function 30 controls the output of an alert which may include an aural warning, the illumination of a lamp, and/or visual depiction of the threat. If terrain proximate the aircraft penetrates the caution envelope boundary, the aural message "Caution Terrain, Caution Terrain" is generated, and alert discretes are provided for activation of visual annunciators. If terrain proximate the aircraft penetrates the warning envelope boundary, the aural message "Warning Terrain" is generated, and alert discretes are provided for activation of visual annunciators.

Results of the threat detection process are combined with background terrain data/obstacle matrix data and data for the nearest runway and formatted into a matching set of display matrix overlays for display on a display 36. Display 36 may comprise any cockpit display, such as, for example, a weather radar display, an Electronic Flight Instrument System (EFIS) display or a Honeywell UDI display.

FIG. 2 contains a block diagram of a GPWS computer 140 suitable for use with the present invention. Unlike the EGPWS computer of FIG. 1, the system of FIG. 2 does not include a terrain data base or methodology for comparing a current position of the aircraft to the stored terrain information. The system of FIG. 2 compares a radar altitude closure rate and height above terrain to detect hazardous proximity to terrain. Such a capability may also be included in the EGPWS computer of FIG. 1.

The EGPWS computer 20 and GPWS computer 140 as shown in FIG. 1 and in FIG. 2, may be implemented as executable code, an analog or digital electronic circuit, on a PCMCIA card, as programmable logic and/or as a general purpose processor. In a preferred embodiment of the invention, warning computer 20 is implemented as a line replaceable unit (LRU) containing a microprocessor. Database 24 is included on a PCMCIA card which may be loaded into the LRU and also used to provide periodic system upgrades.

In addition to the terrain alerting functions described above, the EGPWS and GPWS computers may additionally include other types of warning functions. FIG. 3 diagrams the six basic warning modes for the helicopter ground proximity warning system of the present invention. The various modes provide aural and visual alerts and warnings including warnings for: unsafe proximity to terrain, deviation below ILS glide slope, excessive bank angle, onset of severe wind shear, altitude awareness. Mode one, for example, provides pilots with alert/warnings for high descent rates into terrain. In this mode, a warning device compares the altitude above ground of the aircraft with the descent rate, preferably barometric descent rate, and issues a warning if the descent rate is excessive for the altitude at which the aircraft is flying. A more complete description of an exemplary warning device for indicating excessive descent rate can be found in U.S. Pat. No. 4,551,723, the complete disclosure of which has previously been incorporated herein by reference. Mode two provides warnings for excessive closure rates to terrain with respect to altitude (AGL), phase of flight and speed. Mode three provides warnings for significant altitude loss after takeoff or low altitude go around as described in U.S. Pat. No. 5,666,110. A complete description of the system can be found in U.S. Pat. No. 4,818,992, the complete disclosure of which has previously been incorporated herein by reference.

Mode four provides alerts and warnings for insufficient terrain clearance with respect to phase of flight and speed.

Mode five provides glide slope alerts when the airplane is below 1,000 ft. AGL with the gear down and the glide slope deviation exceeds a threshold number of dots below the ILS glide slope. Mode six provides callouts for descent through predefined altitudes (AGL). In particular, mode six is utilized during autorotation when the aircraft has lost all or partial engine power. Each of the various warning modes provides at least an aural alert for a particular hazard as shown.

Tail Strike Alerting

Figure 4:
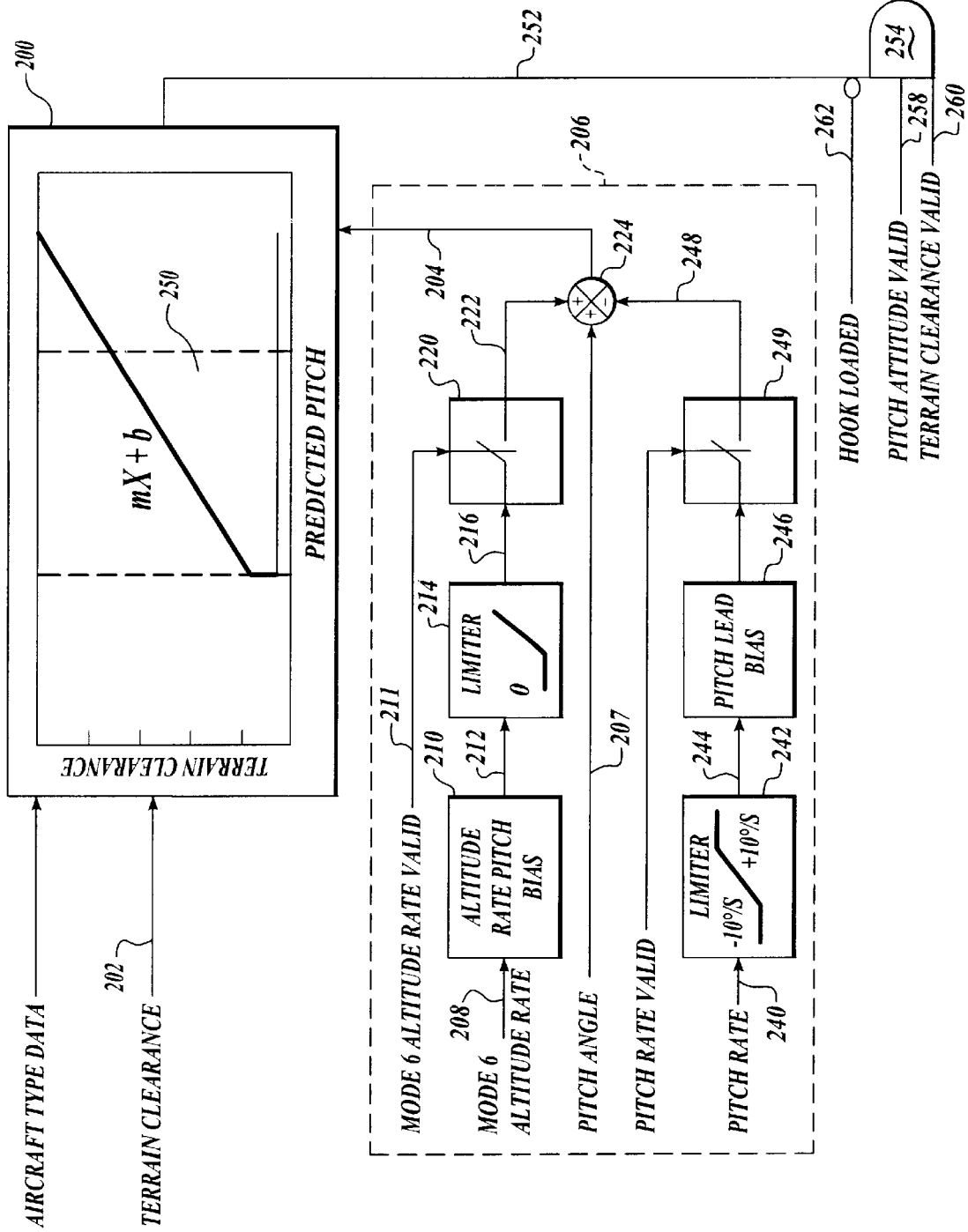
FIG. 4 is a block diagram of a tail strike warning function according to an embodiment of the present invention.

According to the present invention, Mode 6 also includes a capability for alerting the pilot of a helicopter of a possible tail strike condition. FIG. 4 contains a top level block diagram of a tail strike warning function according to a preferred embodiment of the invention. In the embodiment of FIG. 4, a function generator 200 generates a tail strike warning protection envelope as a function of a height above terrain signal 202 and a predicted pitch signal 204. Height above terrain signal 202 is preferably obtained by direct measure using a radio altitude signal. In EGPWS type embodiments, indirect measure is also possible by noting the difference between current MSL altitude and the height of terrain as taken from the terrain database.

According to a preferred embodiment of the invention, the predicted pitch signal is estimated according to the process identified by block 206 of FIG. 4. In block 206 of FIG. 4, a signal 207, indicative of pitch angle is received from an inertial reference or vertical gyro as is familiar to those of skill in the art, and forms the primary basis for measure of the predicted pitch angle 204. Pitch angle signal 207 may be biased by an altitude rate signal and/or pitch rate signal to control sensitivity of the tail strike alert function in various flight conditions.

The altitude rate bias increases the tail strike warning envelope sensitivity as a function of descent rate. The altitude rate bias is obtained by multiplying an altitude rate signal 208 by a gain in block 210. In a preferred embodiment of the invention, the gain term equals a number less than zero, e.g. (−) 0.00016667. Thus, as descent rate increases, the tail strike warning becomes more sensitive.

Altitude rate signal 208 may be obtained as an output signal from the aircraft air data computer. The air data computer also outputs a validity discrete signal 211 to indicate rate data signal 208 is valid. Altitude rate signal 208 may optionally be obtained from analog altitude data sources aboard the aircraft, such as for example, an encoding transponder, or a barometric altimeter as is known to those of skill in the art. These alternative altitude sources can also provide a validity discrete 211. According to a preferred embodiment of the invention, altitude rate signal 208 may be additionally conditioned to account for altimetry errors due to rotor downwash. U.S. Pat. No. 5,781,126 describes a barometric altitude rate detector suitable for use with the present invention.

Because gain 210 of the present invention is less than zero; and, for a descent, altitude rate signal 208 is also less than zero, gain block output signal 212 has a value corresponding to a number greater than zero. Since the altitude rate bias is intended to provide increased warning sensitivity as a function of descent rate, block 214 therefore operates as a limiter such that signal 216 is asserted only when signal 212 is positive. The altitude rate bias is thereby operative only during a descent condition. Switch 220 then switches the resulting rate bias signal 216 onto line 222 for input to summing junction 224.

A pitch rate signal 240 is used to increase the sensitivity of the warning-envelope as a function of pitch rate. The more rapidly the aircraft pitches up, the more rapidly the tail boom pitches down. Signal 240 operates to increase the sensitivity of the warning envelope proportionally. As shown in FIG. 4, pitch rate signal 240 is first input to a limiter 242. Limiter 242 limits the pitch rate modulation of the warning envelope to pitch rates less than 10°/sec. Pitch rate signal 240 may be provided by a pitch rate gyro, an inertial sensor, or differentiated from the pitch angle measurement. Output 244 of limiter 242 is then multiplied by a gain in block 246. Gain 246 is preferably chosen to be greater than zero such that as pitch rate increases the warning sensitivity also increases. In a preferred embodiment of the invention, gain 246 equals 0.5. The output 248 of gain 246 is provided to junction 224 by switch 249.

Junction 224 outputs the pitch angle value as modulated by signals 222 and 248 to envelope function 200. When the coordinate defined by the intersection of terrain clearance value 202 and modulated pitch angle signal 204 lies within protection envelope 250, risk of a tail strike exists and function 200 asserts a signal 252.

Signal 252 is input to a logical AND gate 254 which outputs a tail strike alert signal 256 when signal 252 is asserted and a pitch attitude valid signal 258 and a terrain clearance valid signal 260 are also asserted. Tail strike alert signal 256 may be input to a voice generator that outputs the aural alert: "Tail too low." Optionally, alert signal 256 may be used to activate illumination of a warning lamp or other cockpit visual alert.

In an optional embodiment of the invention, assertion of alert signal 256 may also be conditioned on various factors indicative of certain flight conditions. For example, when the hook is loaded and the aircraft has a load slung underneath, the radio altitude signal is frequently biased to reflect the fact that the load is closer to the ground than the aircraft. The value 202 input to function 200 will therefore cause function 200 to overestimate the risk of a tail strike and nuisance warnings will result. For this reason, a signal 262 can be provided to indicate the hook loaded condition and prevent assertion of tail strike alert signal 256. envelope has a first corner point 700 at eleven degrees and three feet above terrain and a second corner point 702 at 30 degrees and 50 feet above terrain. Predicted pitch angle and terrain height coordinate values within the boundaries of resulting envelope 704 present a potential tail strike hazard and signal 252 will be asserted.

Figure 5:
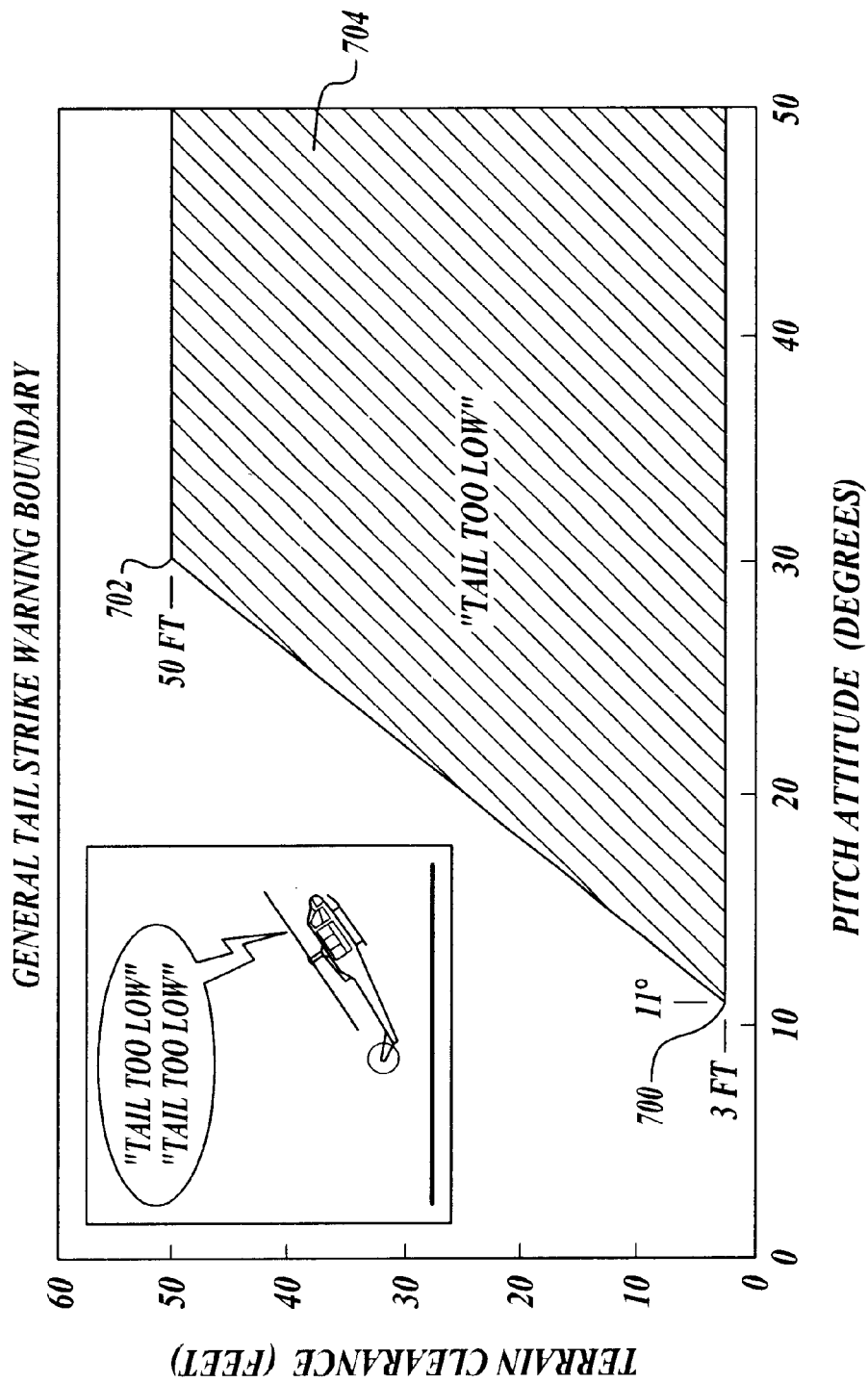
FIG. 5 is a tail strike warning boundary envelope according to an embodiment of envelope according to an embodiment of the present invention.
Figure 6:
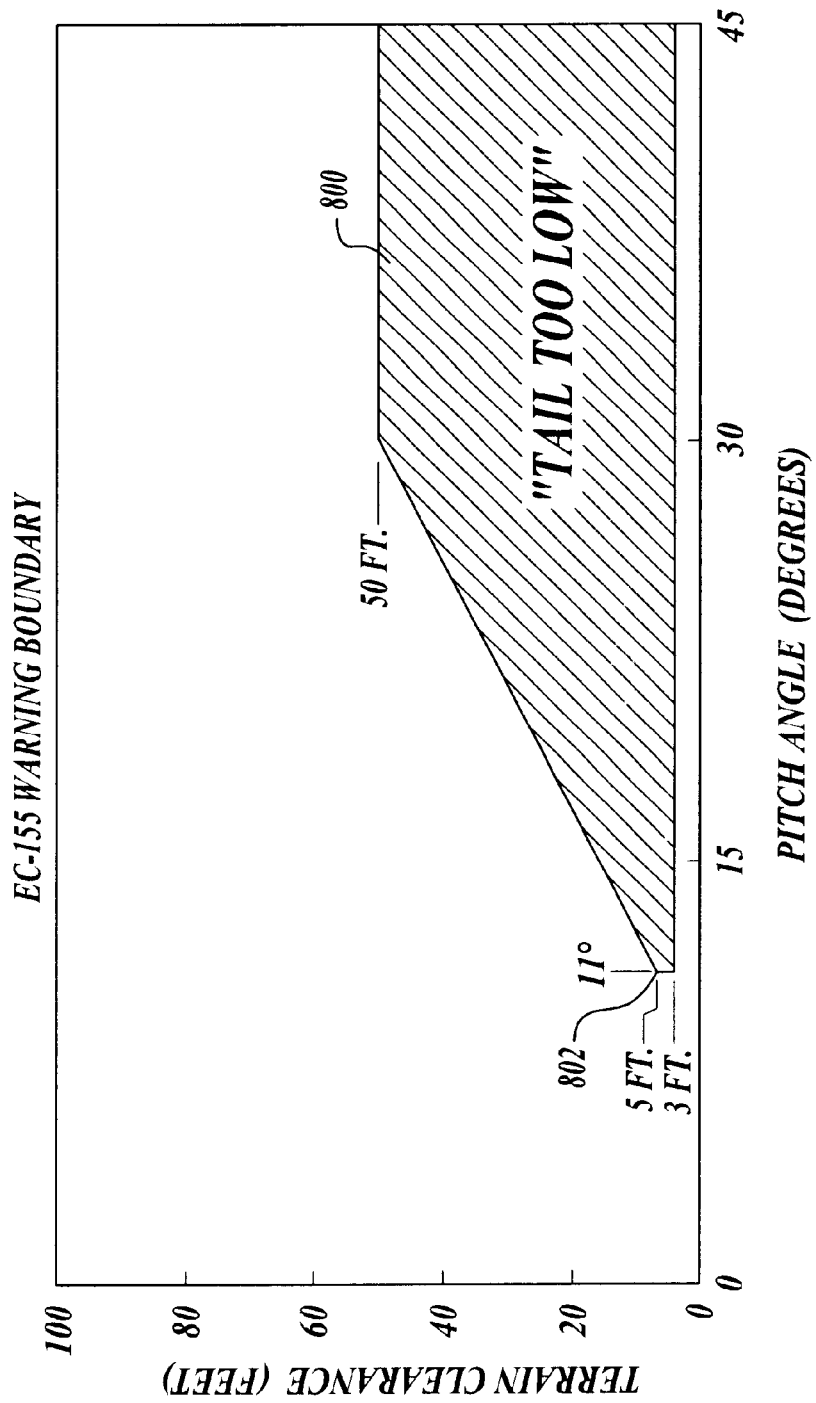
FIG. 6 is a tail strike warning boundary envelope for an EC-155 B aircraft according to an embodiment of the present invention.

The risk of tail strike, however, is also a function of aircraft geometry. For this reason the tail strike warning envelope boundaries are configurable to account for various aircraft configurations and geometries. FIG. 6 illustrates one such envelope for an EC-155 aircraft. In the embodiment of FIG. 6 corner point 802 has been modified from that shown in FIG. 5, to account for the extended tail boom of this aircraft.

Selection of a modified warning envelope particular to a given aircraft can be made by virtue of a programming pin on the LRU. Optionally, the chosen envelope can be loaded directly into the LRU at time of manufacture or installation; or via the PCMCIA card containing the terrain data and system upgrades.

Variations and modifications will be readily apparent to those of skill in the art. For example, the tail strike alert of the present invention need not be integral with a GPWS or EGPWS device and may be implemented, for example, as a stand alone function, apparatus or computer program, or otherwise hosted on any other available aircraft systems having a general purpose processor, or digital or analog electronic logic circuits. For these reasons, the invention is to be interpreted in view of the claims.

What is claimed is:

1. A method for alerting the pilot of a rotary wing aircraft of a tail strike hazard comprising the steps of:
 defining a tail strike alert envelope as a function of a height above terrain and a pitch attitude;
 receiving a signal indicative of an aircraft height above terrain;
 receiving a signal indicative of a pitch attitude of the aircraft;
 biasing the signal indicative of the pitch attitude; and
 outputting an alert signal when said signal indicative of said aircraft height above terrain and said biased signal indicative of said pitch attitude of the aircraft define a condition contained within said envelope.

2. The method of claim 1 wherein said step of receiving a signal indicative of height above terrain comprises the step of receiving a radar altitude signal.

3. The method of claim 1 wherein said step of receiving a signal indicative of said pitch attitude of the aircraft further comprises the step of receiving a signal indicative of a pitch angle of the aircraft.

4. The method of claim 1 wherein biasing the signal indicative of the pitch attitude includes:
 receiving a signal indicative of a pitch rate of the aircraft; and
 using said signal indicative of said pitch rate to bias said signal indicative of said pitch attitude.

5. The method of claim 1 wherein biasing the signal ndicative of the pitch attitude includes:
 receiving a signal indicative of an altitude rate of the aircraft; and
 using said signal indicative of said altitude rate to bias said signal indicative of said pitch altitude.

6. The method of claim 1 wherein the aircraft is a tilt-rotor.

7. The method of claim 1 further comprising the step of modulating said envelope as a function of a descent rate of the aircraft.

8. The method of claim 1 further comprising the step of modulating said envelope as a function of a pitch rate of the aircraft.

9. A computer program product for alerting a pilot of a rotary wing aircraft of a tail strike hazard comprising:
 a computer readable storage medium having computer readable program code means embodied in said medium, said computer readable program code means comprising:
  a first computer instruction means for defining a tail strike alert envelope as a function of a height above terrain and a pitch attitude;
  a second computer instruction means for reading a signal indicative of an aircraft height above terrain;
  a third computer instruction means for reading a signal indicative of a pitch attitude of the aircraft; and
  a fourth computer instruction means for biasing the signal indicative of the pitch attitude;
  a fifth computer instruction means for outputting an alert signal when said signal indicative of said aircraft height above terrain and said biased signal indicative of said pitch attitude of the aircraft define a condition contained within said envelope.

10. The computer program product of claim 9 wherein said signal indicative of height above terrain comprises a radar altitude signal.

11. The computer program of claim 9 wherein said third computer instruction means further comprises a computer instruction means for reading a signal indicative of a pitch angle of the aircraft.

12. The computer program product of claim 9 wherein the fourth computer instruction means includes:
 a computer instruction means for reading a signal indicative of a pitch rate of the aircraft; and
 a computer instruction means for using said signal indicative of said pitch rate to bias said signal indicative of said pitch attitude.

13. The computer program product of claim 9 wherein the fourth computer instruction means includes:
 a computer instruction means for reading a signal indicative of an altitude rate of the aircraft;
 a computer instruction means for using said signal indicative of said altitude rate to bias said signal indicative of said pitch attitude;
 a computer instruction means for summing said second signal, said modulated third signal and said modulated fourth signal to obtain a pitch attitude estimate; and
 an computer instruction means for outputting an alert signal when said signal indicative of said aircraft height above terrain and said pitch attitude estimate define a condition contained within said envelope.

14. The computer program product of claim 9 further comprising a fifth computer instruction means for modulating said envelope as a function of a descent rate of the aircraft.

15. The computer program product of claim 9 further comprising a fifth computer instruction means for modulating said envelope as a function of a pitch rate of the aircraft.

16. A method for alerting a pilot of a rotary wing aircraft of a tail strike hazard comprising the steps of:
 defining a tail strike alert envelope as a function of a height above terrain and a pitch attitude;
 receiving a first signal indicative of an aircraft height above terrain;
 receiving a second signal indicative of a pitch angle of the aircraft;
 receiving a third signal indicative of a pitch rate of the aircraft;
 multiplying said third signal by a first gain to obtain a modulated third signal;
 receiving a fourth signal indicative of an altitude rate of the aircraft;
 multiplying said fourth signal by a second gain to obtain a modulated fourth signal;
 summing said second signal, said modulated third signal and said modulated fourth signal to obtain a pitch attitude estimate; and
 outputting an alert signal when said signal indicative of said aircraft height above terrain and said pitch attitude estimate define a condition contained within said envelope.

17. The method of claim 16 wherein the aircraft is a tilt rotor.

18. The method of claim 16 wherein said signal indicative of a height above terrain comprises a radar altitude signal.

19. The method of claim 16 further comprising the step of limiting said third signal to a predetermined range.

20. The method of claim 19 wherein said predetermined range is approximately +/−10 degrees per second.

21. The method of claim 16 further comprising the step of summing said modulated fourth signal with said modulated third signal and said second signal only when said fourth signal is indicative of an aircraft descent.

22. The method of claim 16 further comprising the step of inhibiting said step of outputting an alert when the aircraft is carrying a sling load.

23. The method of claim 16 wherein said step of outputting an alert further comprises the step of outputting an aural alert.

24. The method of claim 1 wherein said step of outputting an alert further comprises the step of outputting an aural alert.

25. A computer program product for alerting a pilot of a rotary wing aircraft of a tail strike hazard comprising:
   a computer readable storage medium having computer readable program code means embodied in said medium, said computer readable program code means comprising:
      a first computer instruction means for reading a first signal indicative of an aircraft height above terrain;
      a second computer instruction means for reading a second signal indicative of a pitch angle of the aircraft;
      a third computer instruction means for reading a third signal indicative of a pitch rate of the aircraft;
      a fourth computer instruction means for multiplying said third signal by a first gain to obtain a modulated third signal;
      a fifth computer instruction means for reading a fourth signal indicative of an altitude rate of the aircraft;
      a sixth computer instruction means for multiplying said fourth signal by a second gain to obtain a modulated fourth signal;
      a seventh computer instruction means for summing said second signal, said modulated third signal and said modulated fourth signal to obtain a pitch attitude estimate; and
      an eighth computer instruction means for outputting an alert signal when said signal indicative of said aircraft height above terrain and said pitch attitude estimate define a condition contained within said envelope.

26. The computer program product of claim 25 wherein said signal indicative of a height above terrain comprises a radar altitude signal.

27. The computer program product of claim 25 wherein said third computer instruction means further includes a ninth computer instruction means to limit said third signal to a predetermined range.

28. The computer program product of claim 27 wherein said predetermined range is approximately +/−10 degrees per second.

29. The computer program product of claim 25 wherein said seventh computer instruction means sums said modulated fourth signal with said modulated third signal and said second signal only when said fourth signal is indicative of an aircraft descent.

30. The computer program product of claim 25 further comprising a ninth computer instruction means for inhibiting said eighth computer instruction means when the aircraft is carrying a sling load.

31. The computer program product of claim 25 wherein said eighth computer instruction means further comprises a ninth computer instruction means for outputting an aural alert.

32. An apparatus for alerting a pilot of a rotary wing aircraft of a tail strike hazard, the apparatus comprising:
   an input coupled to receive a signal indicative of an aircraft height above terrain and a signal indicative of a pitch attitude of the aircraft;
   an output; and
   a signal processor, coupled to said input and to said output, for:
      biasing the signal indicative of the pitch attitude;
      defining a tail strike alert envelope as a function of a height above terrain and a pitch attitude; and
      outputting an alert signal when said signal indicative of said aircraft height above terrain and said biased signal indicative of said pitch attitude of the aircraft define a condition contained within said envelope.

33. The apparatus of claim 32 wherein said signal indicative of height above terrain comprises a radar altitude signal.

34. The apparatus of claim 32 wherein said signal indicative of said pitch attitude of the aircraft comprises a signal indicative of a pitch angle of the aircraft.

35. The apparatus of claim 32 wherein said input is further coupled to receive a signal indicative of a pitch rate of the aircraft and wherein said signal processor further uses said signal indicative of said pitch rate to bias said signal indicative of said pitch attitude.

36. The apparatus of claim 32 wherein said input is further coupled to receive a signal indicative of an altitude rate of the aircraft and wherein said signal processor further uses said signal indicative of said altitude rate to bias said signal indicative of said pitch attitude.

37. The apparatus of claim 32 wherein the aircraft is a tilt-rotor.

38. The apparatus of claim 32 wherein said signal processor further modulates said envelope as a function of a descent rate of the aircraft.

39. The apparatus of claim 32 wherein said signal processor further modulates said envelope as a function of a pitch rate of the aircraft.

40. The apparatus of claim 32 wherein said signal processor further outputs said alert signal as an aural alert.

41. The apparatus of claim 32 wherein said signal processor comprises a general purpose processor.

42. An apparatus for alerting a pilot of a rotary wing aircraft of a tail strike hazard the apparatus comprising:
   an input coupled to receive a first signal indicative of an aircraft height above terrain, a second signal indicative of a pitch angle of the aircraft, a third signal indicative of a pitch rate of the aircraft and a fourth signal indicative of an altitude rate of the aircraft;
   an output; and
   a signal processor coupled to said input and to said output for:
      defining a tail strike alert envelope as a function of a height above terrain and a pitch attitude;
      multiplying said third signal by a first gain to obtain a modulated third signal;
      multiplying said fourth signal by a second gain to obtain a modulated fourth signal;
      summing said second signal, said modulated third signal and said modulated fourth signal to obtain a pitch attitude estimate; and
      outputting an alert signal when said signal indicative of said aircraft height above terrain and said pitch attitude estimate define a condition contained within said envelope.

43. The apparatus of claim 42 wherein the aircraft is a tilt rotor.

44. The apparatus of claim 42 wherein said signal indicative of a height above terrain comprises a radar altitude signal.

45. The apparatus of claim 42 wherein said signal processor further limits said third signal to a predetermined range.

46. The apparatus of claim 45 wherein said predetermined range is approximately +/−10 degrees per second.

47. The apparatus of claim 42 wherein said signal processor sums said modulated fourth signal with said modulated third signal and said second signal only when said fourth signal is indicative of an aircraft descent.

48. The apparatus of claim 42 wherein said signal processor inhibits outputting an alert when the aircraft is carrying a sling load.

49. The apparatus of claim 42 wherein said alert signal comprises an aural alert.

50. The apparatus of claim 42 wherein said signal processor comprises a general purpose processor.

51. In a GPWS device, an improvement to alert a pilot of a rotary wing aircraft of a tail strike hazard, the improvement comprising:
   an input coupled to receive a signal indiactive of an aircraft height above terrain and a signal indicative of a pitch attitude of the aircraft;
   an output; and
   a signal processor coupled to said input and to said output, for;
      biasing the signal indicative of a pitch attitude;
      defining a tail strike alert envelope as a function of a height above terrain and a pitch attitude; and
      outputting an alert signal when said signal indicative of said pitch attitude above terrain and said biased signal indicative of said pitch attitude of the aircraft define a condition contained within said envelope.

52. The improvement of claim 51 wherein the GPWS device comprises an EGPWS device.

53. The improvement of claim 51 wherein said signal processor further modulates said envelope as a function of a descent rate of the aircraft.

54. The improvement of claim 51 wherein said signal processor further modulates said envelope as a function of a pitch rate of the aircraft.

55. The improvement of claim 51 wherein said signal processor comprises a general purpose processor contained within the GPWS device.

56. The improvement of claim 51 wherein said signal processor outputs said alert signal as an aural alert.

57. In a GPWS device, an improvement to alert a pilot of a rotary wing aircraft of a tail strike hazard, the improvement comprising:
   an input coupled to receive a first signal indicative of an aircraft height above terrain, a second signal indicative of a pitch angle of the aircraft, a third signal indicative of a pitch rate of the aircraft and a fourth signal indicative of an altitude rate of the aircraft;
   an output; and
   a signal processor coupled to said input and to said output for:
      defining a tail strike alert envelope as a function of a height above terrain and a pitch attitude;
      multiplying said third signal by a first gain to obtain a modulated third signal;
      multiplying said fourth signal by a second gain to obtain a modulated fourth signal;
      summing said second signal, said modulated third signal and said modulated fourth signal to obtain a pitch attitude estimate; and
      outputting an alert signal when said signal indicative of said aircraft height above terrain and said pitch attitude estimate define a condition contained within said envelope.

58. The improvement of claim 57 wherein the GPWS device comprises an EGPWS device.

59. The improvement of claim 57 wherein said signal processor comprises a general purpose processor contained within the GPWS device.

60. The improvement of claim 57 wherein said signal processor outputs said alert signal as an aural alert.

61. The improvement of claim 57 wherein said signal processor inhibits output of said alert signal when the aircraft is carrying a sling load.

* * * * *